US009356454B2

(12) United States Patent  (10) Patent No.: US 9,356,454 B2
Caren et al.  (45) Date of Patent: May 31, 2016

(54) APPARATUS FOR CHARGING BATTERIES OF DEVICES AT A SELECTED DC VOLTAGE

(71) Applicant: Magnadyne Corporation, Compton, CA (US)

(72) Inventors: Barry L. Caren, Beverly Hills, CA (US); Wen-Tsan Yeh, Torrance, CA (US)

(73) Assignee: Magnadyne Corporation, Compton, CA (US)

( * ) Notice: Subject to any disclaimer, the term of this patent is extended or adjusted under 35 U.S.C. 154(b) by 0 days.

(21) Appl. No.: 14/215,177

(22) Filed: Mar. 17, 2014

(65) Prior Publication Data

US 2015/0263551 A1  Sep. 17, 2015

(51) Int. Cl.
*H04B 1/38* (2015.01)
*H02J 7/00* (2006.01)
*H04M 1/11* (2006.01)

(52) U.S. Cl.
CPC ............ *H02J 7/0042* (2013.01); *H02J 7/0027* (2013.01); *H02J 7/0052* (2013.01); *H04M 1/11* (2013.01); *Y02E 60/12* (2013.01)

(58) Field of Classification Search
CPC ........... H04M 1/72519; H04M 1/6066; H04B 1/3883; Y02E 60/12
USPC .................... 455/573, 569.1, 550.1; 361/810; 320/107
See application file for complete search history.

(56) References Cited

U.S. PATENT DOCUMENTS

| | | | |
|---|---|---|---|
| 6,459,604 B1 | 10/2002 | Youn et al. | |
| 6,956,353 B1* | 10/2005 | Klitzner | H02J 7/0003 320/107 |
| 7,960,859 B2 | 6/2011 | Menas et al. | |
| 8,107,243 B2 | 1/2012 | Guccione et al. | |
| 8,149,570 B2 | 4/2012 | Keebler et al. | |
| 8,441,230 B2 | 5/2013 | Boyles et al. | |
| 8,559,172 B2 | 10/2013 | Byrne | |
| 8,610,313 B2 | 12/2013 | Makwinski | |
| 8,629,654 B2 | 1/2014 | Partovi et al. | |
| 2006/0197497 A1 | 9/2006 | Wong et al. | |
| 2008/0003959 A1* | 1/2008 | Lee | H03F 3/217 455/127.1 |
| 2009/0278506 A1* | 11/2009 | Winger | H02J 7/0068 320/160 |
| 2010/0213892 A1 | 8/2010 | Desanctis | |
| 2011/0007491 A1* | 1/2011 | Robinson | G06F 1/263 361/810 |
| 2012/0019392 A1 | 1/2012 | Yamamoto et al. | |
| 2013/0038297 A1* | 2/2013 | Sang | H02J 7/0073 320/145 |
| 2013/0280956 A1 | 10/2013 | Cheng et al. | |
| 2014/0117923 A1* | 5/2014 | Hawawini | G06F 1/26 320/107 |
| 2014/0122909 A1* | 5/2014 | Hawawini | H02J 7/0004 713/310 |

OTHER PUBLICATIONS

Power Integrations, CHY100 ChiPhy (Trademark) Family, Charger Interface Physical Layer IC, www.powerint.com, Jul. 2013.
Motorola User'S Guide, I465 (2009).
Universal Charging Station with 10 Built-In Connectors, One Charger-Unlimited Charging Capabilities (Apr. 15, 2009).

(Continued)

*Primary Examiner* — Danh Le
(74) *Attorney, Agent, or Firm* — Brooks Kushman P.C.

(57) ABSTRACT

A battery charging apparatus for charging batteries of fixed voltage charge receiving batteries and flexible voltage charge receiving batteries. A wall receptacle charger outlet, an "all-in-one" vehicle or home charger, a hands-free docking station charger, a wall mountable USB charging strip and a holder for multiple charger receiving devices that includes a charger are disclosed.

9 Claims, 9 Drawing Sheets

(56) References Cited

OTHER PUBLICATIONS

Sprint, All-in-One Charger, Power Your Phone and Accessories Anywhere, 2-in-1 Display Box (PRX0311V) (May 3, 2011).
Magnadyne Marking Instructions, For LG Cell Set, for Sanyo Cell Set (Aug. 31, 2007).
Magnadyne, Multi-Charger Pro Universal Pro Universal Charging Station, Service Card-Initial Setup (Mar. 23, 2009).
Magnadyne, Packaging Instructions for BT5VUSB22L-C6B 2200 mAh Battery Booster with Spring Logo (#PGU2667) (Sep. 4, 2007).
Magnadyne, Universal Charging Station, One Charger with Unlimited Charging Possibilities (Apr. 15, 2009).
Magnadyne, Single USB Charging/Single Wall Outlet, Copyright 2012.
Magnadyne Corporation, Dual VPA Socket and USB Port Adapter Model: DVU-3, Copyright 2011 (Jul. 20, 2011).
Magnadyne, Face Artwork for 5V1 Wall Mount Dual USB Charger/Dual AC Outlet Plate, Above Artwork same Gloss Finish as WC-201 (Nov. 30, 2012).
Magnadyne, Dual VPA Socket and USB Port Adapter Model: DVU-2, Installation Sheet (Dec. 27, 2006).
Sprint, Spring Portable Power Pack User Guide (Sep. 5, 2007).
International Search Report and Written Opinion, International application No. PCT/US2015/016077, mailed Jun. 15, 2015.

* cited by examiner

APPARATUS FOR CHARGING BATTERIES OF DEVICES AT A SELECTED DC VOLTAGE

TECHNICAL FIELD

This disclosure relates to apparatus that have receptacles for charging one or more devices that are powered with DC battery at a voltage level selected based upon signals received from the device receiving the charge.

BACKGROUND

Battery powered devices must be periodically recharged. Most battery powered devices are configured to be charged at a predetermined voltage. Most chargers are configured to provide a predetermined level of current at a set voltage. Given these limitations, a substantial period of time is required to charge the battery of a battery powered device depending upon the extent of depletion of the battery.

Most battery chargers for cellular telephones and tablet computers provide a fixed voltage level that is typically 5 volts. Some battery powered rapid charge cellular telephones have been developed that can be charged with a dedicated AC charger that is plugged into a conventional AC wall receptacle that has a DC output wire that is plugged into the device that can provide a higher level of voltage for charging rapid charge telephones. Alternatively, the rapid charge telephones may be charged with a car charger that is connected by a wire to a vehicle DC charge outlet or Universal Serial Bus (USB) receptacle.

Many consumers have several such devices including some fixed five volt devices and possibly other rapid charge devices that are charged at a higher voltage. This creates potential compatibility problems when different chargers are used to charge different devices. A rapid charge device will not achieve rapid charging when charged with a conventional low voltage charger.

As a result of the proliferation of battery powered portable devices there is a need to conveniently charge many devices at the same time. While wall mounted multiple USB receptacles are available that may be used to several battery powered devices all of the receptacles are limited to providing the same voltage output. There is no multiple receptacle system for providing a device selected voltage output for more rapid charging. Wall mounted multiple USB receptacles that are currently available are limited to being powered by an AC power source.

Battery powered devices may also be recharged by so called "all-in-one" chargers from either a DC power source socket in a vehicle or an AC power source in a building. All-in-one chargers provide a fixed level of charge to the device receiving the charge and do not accommodate a device selected voltage output for more rapid charging.

Another approach to charging battery powered devices is to charge them while in a "hands-free" docking device that is connected to the DC power supply of the vehicle. Alternatively, battery powered devices may be charged while in a docking station in an office or in a home that is powered by an AC power source. These prior charging implements are all limited to charging battery powered devices at a fixed voltage and cannot accommodate battery powered devices that may be charged more quickly with a device selected voltage output for more rapid charging.

This disclosure is directed to solving the above problem and other problems as summarized below.

SUMMARY

According to one aspect of this disclosure, a receptacle assembly is disclosed for charging a selectable charge receiving device powered by a DC battery that is adapted to be mounted in a wall. The receptacle assembly comprises a housing adapted to be secured to the wall and a cover plate that is attached to the housing. At least one multiple voltage output receptacle is provided on the cover plate and is adapted to provide a default level of voltage and a device selected predetermined level of voltage that is greater than the default level of voltage for charging the selectable charge receiving device.

According to other aspects of this disclosure as it relates to the receptacle assembly, at least one single voltage receptacle may be provided on the cover plate that is adapted to provide a fixed voltage level for a fixed charge receiving device that may only be charged at a fixed voltage level. The at least one single voltage receptacle may be provided with a fixed output converter circuit that provides a fixed voltage to fixed charge receiving devices connected to the single voltage receptacle and is enclosed by the housing and cover plate.

The housing and cover plate may enclose a control circuit that communicates with the selectable charge receiving device that is adapted to be charged at the predetermined level of voltage and that provides a charging level signal, a voltage switching circuit that receives the charging level signal, and a variable output AC/DC converter circuit controlled by the voltage switching circuit that is configured to provide the predetermined level of voltage to the selectable charge receiving device. Alternatively, the housing and cover plate may enclose a control circuit that communicates with the selectable charge receiving device that is adapted to be charged at the predetermined level of voltage and that provides a charging level signal, a voltage switching circuit that receives the charging level signal, and a variable output DC/DC converter circuit controlled by the voltage switching circuit that is configured to provide the predetermined level of voltage to the selected charge receiving device.

According to another aspect of this disclosure, a portable battery charger is disclosed for a selectable charge receiving device. The portable battery charger comprises a housing having a first plug adapted to be inserted into a DC receptacle and a second plug adapted to be inserted into an AC receptacle. At least one multiple voltage receptacle is provided on the housing for charging the selectable charge receiving device and is adapted to provide a default level of voltage and a predetermined level of voltage that is greater than the default level of voltage.

The portable battery charger housing encloses a control circuit that communicates with the selectable charge receiving device that is adapted to be charged at a predetermined level of voltage that the device may be charged at and that also provides a charging level signal. A voltage switching circuit receives the charging level signal and controls a variable output converter circuit that is configured to provide a DC charging voltage to the selectable charge receiving device.

According to another aspect of this disclosure, a hands-free docking station is provided for a cellular telephone. The docking station includes a cellular telephone holder and a connector that is adapted to charge the cellular telephone in the holder. The connector is adapted to provide a default level of voltage and a cellular telephone selected predetermined level of voltage that is greater than the default level of voltage.

The hands-free docking station may further comprise a control circuit that communicates with the cellular telephone that is adapted to be charged at a predetermined level of voltage that is greater than the default level of voltage for charging the cellular telephone and that provides a charging level signal. A voltage switching circuit receives the charging level signal and controls a variable output converter circuit that is configured to provide a DC charging voltage to the cellular telephone.

According to other aspects of this disclosure relating to the hands-free docking station, the variable output converter circuit may be adapted to be connected to a DC power supply. Alternatively, the variable output converter circuit may be adapted to be connected to an AC power supply. The control circuit, the voltage switching circuit and the converter circuit may all be enclosed within a housing.

According to another aspect of this disclosure, a receptacle strip assembly is disclosed that is adapted to be mounted on a wall for charging a selectable charge receiving device powered by a DC battery. The assembly comprises a housing adapted to be secured to the wall and at least one multiple voltage output receptacle provided on the housing and adapted to provide a default level of voltage and a device selected predetermined level of voltage that is greater than the default level of voltage for charging the selectable charge receiving device.

The housing encloses a control circuit that communicates with the selectable charge receiving device. The selectable charge receiving device is adapted to be charged at the predetermined level of voltage and also provides a charging level signal. A voltage switching circuit receives the charging level signal and controls a variable output AC/DC converter circuit that is configured to provide the predetermined level of voltage to the selectable charge receiving device. The housing further encloses at least one single voltage receptacle and a fixed output converter circuit that provides a fixed voltage level to at least one fixed charge receiving device connected to the single voltage receptacle.

According to another aspect of this disclosure, a holder is disclosed for a plurality of portable battery operated devices that is adapted to charge a selectable charge receiving device powered by a DC battery. The holder comprises a rack for retaining the plurality of battery operated devices. A housing is provided on the rack that includes at least one multiple voltage output receptacle provided on the housing that is adapted to provide a default level of voltage and a device selected predetermined level of voltage that is greater than the default level of voltage for charging the selectable charge receiving device. The housing encloses a control circuit that communicates with the selectable charge receiving device that is adapted to be charged at the predetermined level of voltage. The control circuit also provides a charging level signal to a voltage switching circuit. A variable output AC/DC converter circuit is controlled by the voltage switching circuit and is configured to provide the predetermined level of voltage to the selectable charge receiving device.

The above aspects of this disclosure and other aspects are described in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
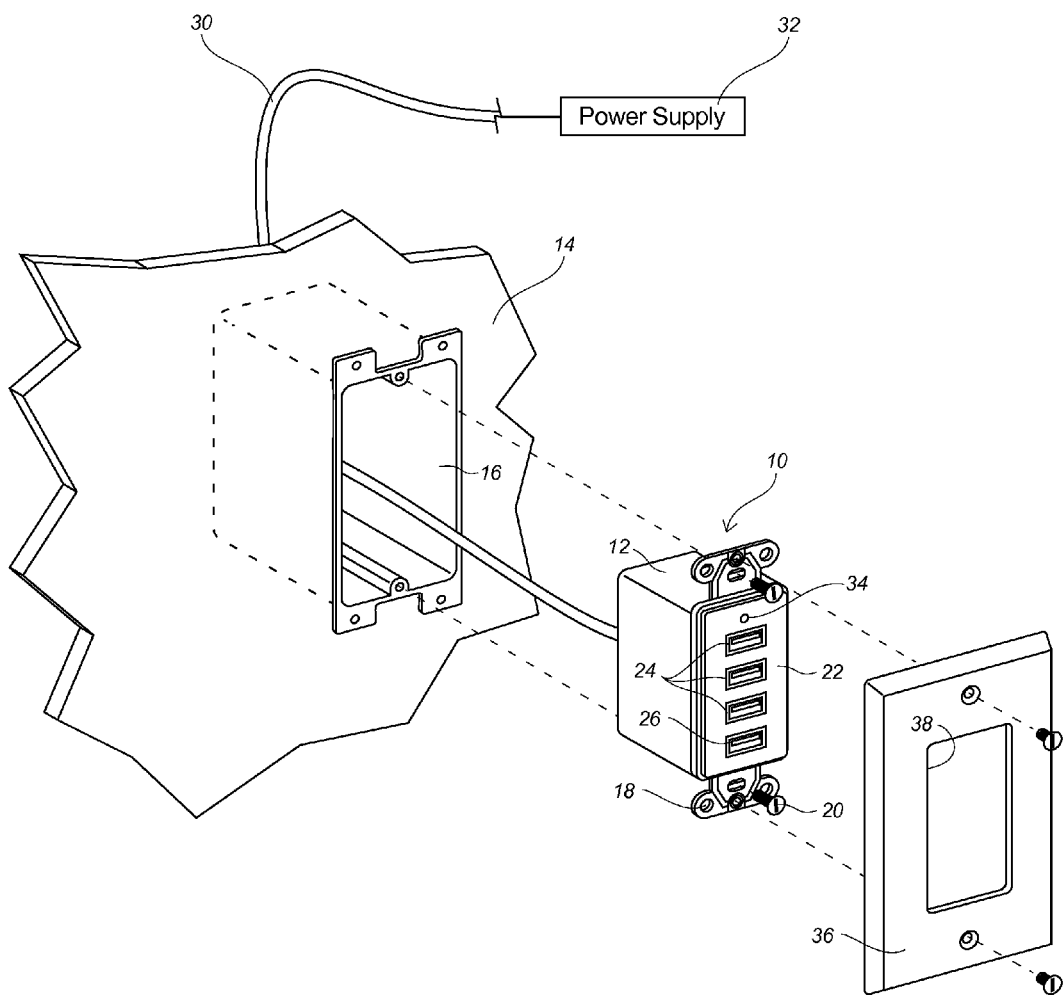
FIG. 1 is an exploded perspective view of a wall mounted charging receptacle that is connected to a power source and that includes four USB receptacles.

Referring to FIG. 1, a receptacle assembly generally indicated by reference numeral 10 includes a housing 12 that is adapted to be mounted in a wall 14 of a building or a recreational vehicle. The housing 12 is configured to be received in a standard electrical box 16. The housing has mounting tabs 18 that receive screws or bolts 20 for connecting the housing to the electrical box 16. A cover plate 22 encloses the housing 12 that is configured to be received in a standard opening 38 in a cover plate 22.

Three fixed voltage receptacles 24 are illustrated that are provided on the housing 12 above a multiple voltage receptacle 26. The receptacles 24 and 26 as illustrated are Universal Serial Bus (USB) receptacles but it should be understood that other types of receptacles could be used as an alternative.

An electrical cable 30, or wire, is connected to a power supply 32 and is connected in the housing to the USB receptacles as will be more fully described below with reference to FIG. 2. The power supply for a building would be an AC power supply but the power supply for a recreational vehicle would be a DC power supply. An LED power indicator 34 may be provided on the housing to indicate that the receptacles are connected to a source of AC power 32.

A standard wall plate 36 is illustrated that defines a standardized wall plate opening 38. The cover plate 22 attached to the housing 12 is adapted to be received in the opening 38 after the housing 12 is secured within the electrical box 16.

Figure 2:
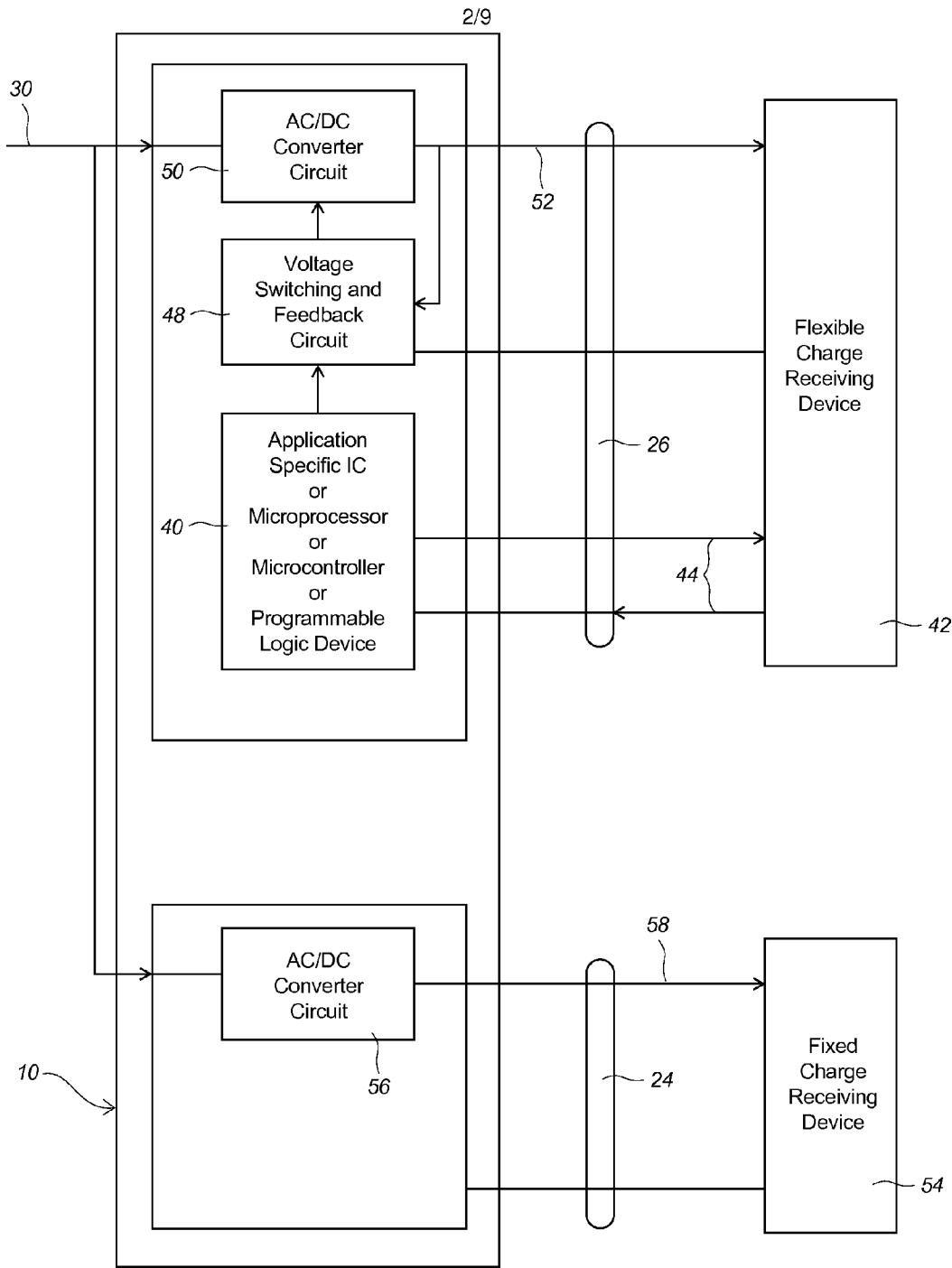
FIG. 2 is a schematic of the charging receptacle shown in FIG. 1 that is configured to provide AC/DC voltage conversion and a multiple voltage output and an AC/DC voltage conversion and a fixed voltage output.

Referring to FIG. 2, an AC/DC control circuit is schematically illustrated that may be incorporated in the receptacle assembly 10. The control circuit is capable of charging a flexible charge receiving device 42 at different device selected charging voltages.

Handshaking signals are sent and received on dedicated data pins 44 of the multiple voltage USB receptacle 26 to connectors that connect the controller circuit 40 to the selected charge receiving device 42. The controller circuit 40 may be an application specific integrated circuit ("ASIC"), a microprocessor microcontroller, or a programmable logic device. The controller circuit 40 queries the selected charge receiving device 42 to determine if the selected charge receiving device is adapted to receive a charge at a different voltage level than a standard voltage of, for example, 5 volts DC. If so, the controller circuit 40 sends a signal at 46 to a voltage and switching and feedback circuit 48 that controls an AC/DC converter circuit 50 to change the charging voltage supplied on the line 52 to the selected charge receiving device 42.

In the illustrated embodiment of FIG. 1, three fixed voltage USB receptacles 24 are shown that are each connected to a fixed charge receiving device 54 and an AC/DC charge converter 56. For illustration purposes only one AC/DC converter circuit 56 is shown in FIG. 2 that may be connected to a plurality of USB sockets. The AC/DC charge converter 56 provides a fixed voltage level on the line 58 to the fixed charge receiving device 54.

Figure 3:
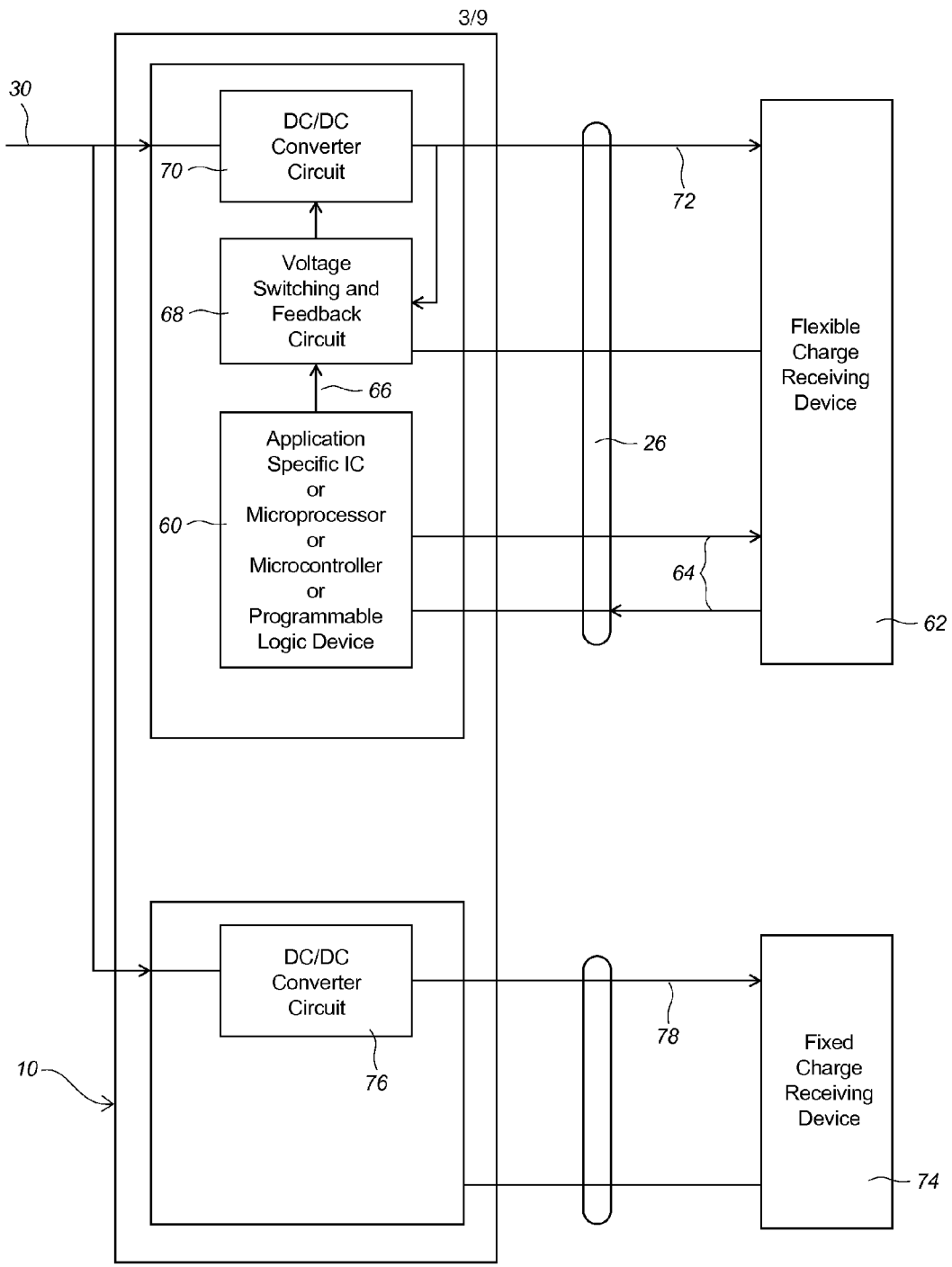
FIG. 3 is a schematic of the charging receptacle shown in FIG. 1 that is configured to provide DC/DC voltage conversion and a multiple voltage output and a DC/DC voltage conversion and a fixed voltage output.

Referring to FIG. 3, a DC/DC controller circuit 60 is schematically illustrated that may be incorporated in the receptacle assembly 10 shown in FIG. 1. The controller circuit 60 is capable of charging a selected charge receiving device 62 at different charging rates based upon the voltage provided by the receptacle assembly 10.

Handshaking signals are sent and received on dedicated data pins 64 of the multiple voltage USB receptacle 26 to connectors that connect the controller circuit 60 to the selected charge receiving device 62. The DC/DC controller circuit 60 may be an ASIC, a microprocessor microcontroller or a programmable logic device. The controller circuit 60 communicates with the selected charge receiving device 62 to determine if the selected charge receiving device is adapted to receive a charge at a different voltage level than a standard voltage. If so, the controller circuit 60 sends a signal at 66 to a voltage and switching and feedback circuit 68 that controls a DC/DC converter circuit 70 to change the charging voltage supplied on the line 72 to the selected charge receiving device 62.

In FIG. 1, three fixed voltage USB receptacles 24 are each connected to a fixed charge receiving device 74 and a DC/DC charge converter 76. Only one DC/DC converter circuit 76 is shown in FIG. 3 that may be connected to several USB receptacles. The DC/DC charge converter 76 provides a fixed voltage level on the line 78 to the fixed charge receiving device 74.

Figure 4:
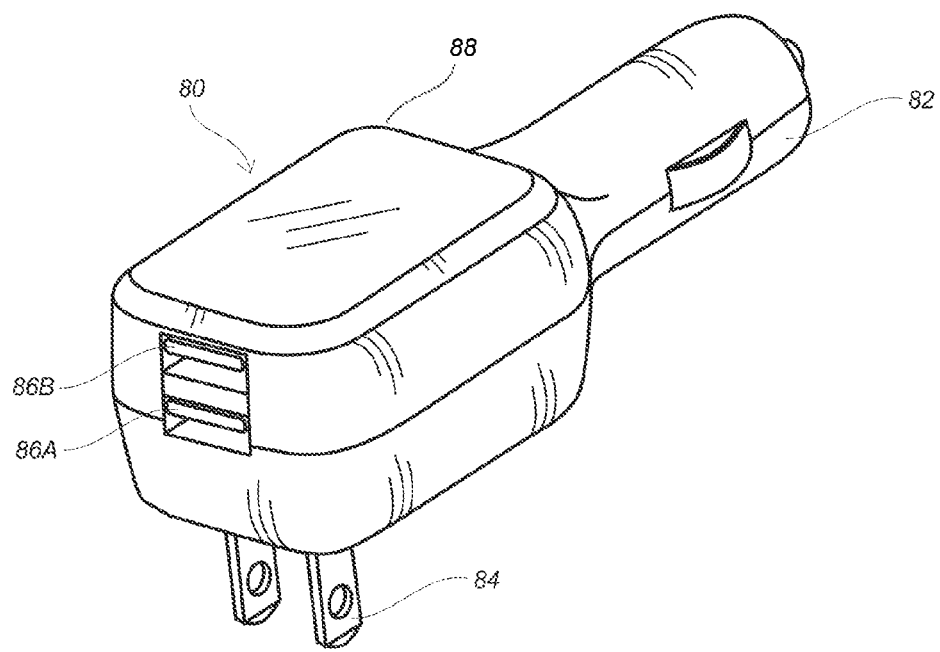
FIG. 4 is a perspective view of a battery charger including a vehicle DC power adapter and an AC wall plug that a may be alternatively utilized to provide either a multiple voltage or a fixed voltage to a battery of a battery powered device.

Referring to FIGS. 2-4, an "all-in-one" charger 80 is illustrated that includes a 12 volt plug 82 on one end is adapted to be received in a 12 volt power accessory socket in a vehicle (not shown). A pair of AC plug prongs 84 are provided on the charger 80 that are adapted to be received in an AC receptacle wall socket (not shown). At least one socket 86A, and as illustrated, two USB sockets 86A and 86B, may be provided on a housing 88 of the charger 80.

Socket 86A is a multiple voltage receptacle and socket 86B is a fixed voltage receptacle. The 12 volt plug 82 may be connected to the controller circuit 60, voltage switching circuit 68, and variable output AC/DC converter circuit 70 that may all be contained within the housing 88.

Socket 86B is a fixed voltage receptacle that is connected to a fixed output DC/DC converter circuit 76 that provides a fixed voltage to a fixed charge receiving device 74. The fixed output DC/DC converter circuit 76 is also contained within the housing 88.

The prongs 84 for the AC receptacle may be connected to the controller circuit 40 (as shown in FIG. 2), the voltage switching circuit 48, and variable output AC/DC converter circuit 50 that are all contained within the housing 88. Socket 86A provides a multiple voltage from the controller circuit 40, the voltage switching circuit 48, and variable output AC/DC converter circuit 50 to a selected charge receiving device 42. A fixed charge receiving device 54 may be connected to the socket 86B to receive a fixed voltage charge from the fixed output AC/DC converter circuit 76 that is disposed within the housing 88.

Figure 5:
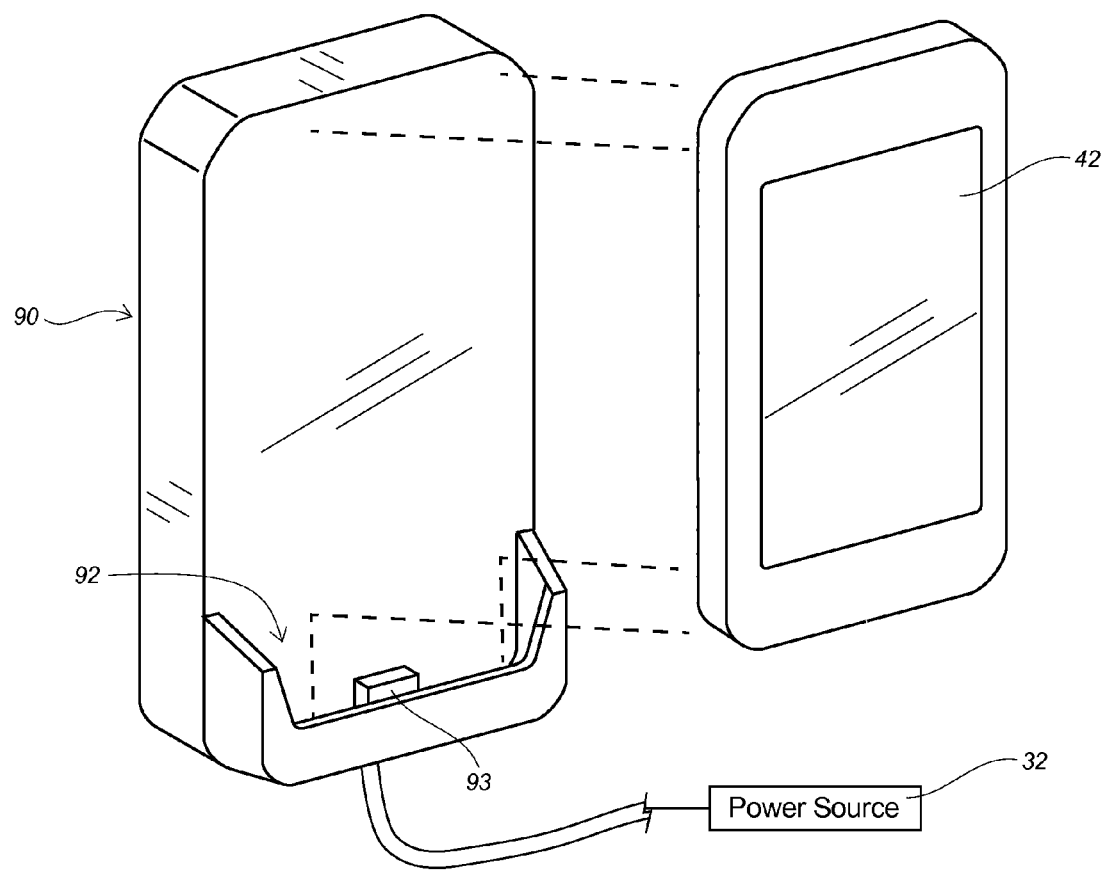
FIG. 5 is a perspective view of a hands-free device that is used to provide either a multiple voltage or a fixed voltage to a battery of a battery powered device.

Referring to FIGS. 2, 3 and 5, a hands-free device 90 is disclosed that is used to provide either a multiple voltage or a fixed voltage to a battery of a battery powered device that is docked in a docking station 92. The hands-free device 90 may be used in a vehicle having 12 volt DC power or may be connected to a source of 110 volt AC power. A socket 93 is provided on the docking station 92 that is adapted to be connected to either a fixed charge receiving battery powered telephone or a selected charge receiving battery powered telephone.

If the hands-free device 90 is connected to an AC power source 32, the controller circuit 40, the voltage switching circuit 48, and variable output AC/DC converter circuit 50 are disposed within the hands free device 90 to charge a selected charge receiving device 42. If the hands-free device is connected to a DC power source 32 such as a vehicle, the controller circuit 60, voltage switching circuit 68, and variable output DC/DC converter circuit 70 may all be contained within the hands-free device 90.

Figure 6:
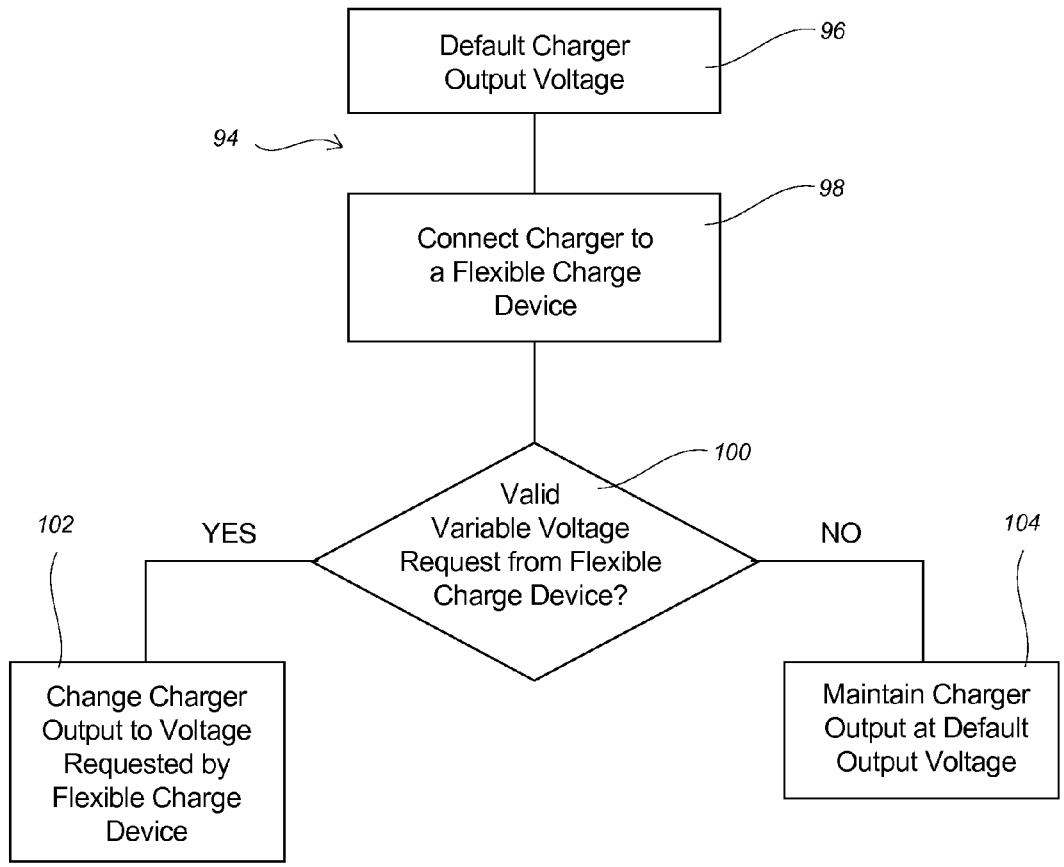
FIG. 6 is a simplified flow chart showing how the charger provides a fixed voltage output as a default but then communicates with the selected charging device to provide a selected higher charging voltage.

Referring to FIGS. 2, 3 and 6, a simplified flow chart 94 is provided that illustrates the algorithm used to provide either a multiple voltage to a selected charge receiving device 42 or 62 or a fixed voltage to a fixed charge device 54 or 74. Initially, at 96, the charger is shown to be providing a fixed voltage as a default output. When a selected charge device is attached to the charger, at 98 the controller circuit 40 or 60 determines, at 100, whether a valid variable output voltage request was received from the selected charge receiving device 42 or 62. If so, the charger output is changed, at 102, to the voltage requested from the device selected charge receiving device. If a valid request is not received at 100 the charger output remains unchanged, at for example 5 volts, at 104.

A more extensive description of the charger circuitry is disclosed in applicants assignee's co-pending application Ser. No. 14/108,884 filed Dec. 17, 2013, the disclosure of which is hereby incorporated by reference.

Figure 7:
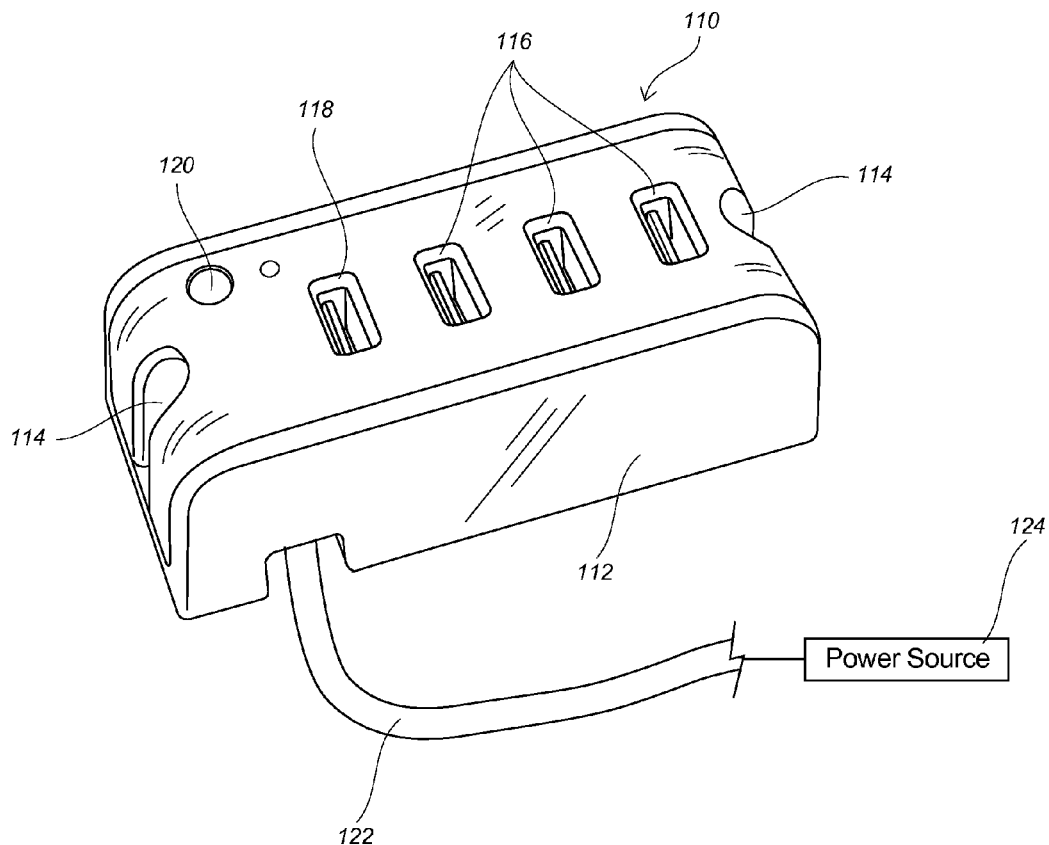
FIG. 7 is a perspective view of a wall mountable strip charging receptacle that is used to provide either a multiple voltage or a fixed voltage to a battery of a battery powered device.

Referring to FIG. 7, a USB receptacle strip assembly is illustrated and is generally indicated by reference numeral 110. The USB receptacle strip assembly 110 includes a housing 112 that has fastener slots 114 at opposite ends that are adapted to receive fasteners such as screws or bolts for securing the housing 112 to a wall (not shown). Three fixed voltage receptacles 116 and one multiple voltage output receptacle 118 are provided on the housing 112. The fixed voltage receptacles 116 are adapted to provide a fixed voltage output to a fixed charge receiving device or a flexible charge receiving device. The flexible voltage receptacle 118 is adapted to provide a default level of voltage or a device selected predetermined level of voltage that is greater than the default level of voltage.

Referring to FIGS. 2, 3 and 7, the housing 112 encloses a controller circuit 40 that communicates with the selectable charge receiving device 42 that is adapted to be charged at the predetermined level of voltage. The controller circuit 40 provides the charging level signal at 46 to the voltage switching circuit 48. The variable output AC/DC converter circuit 50 is controlled by the voltage switching circuit 48 that is configured to provide the predetermined level of voltage on line 52 to the selectable charge receiving device 42. The housing 112 further encloses the fixed output converter circuit 56 that provides a fixed voltage level to at least one fixed charge receiving device 54 that may be connected to the fixed voltage receptacles 116. A LED indicator light 120 is provided to indicate that the receptacle strip is connected through the wire 122 to a source of power 124. Alternatively, the source of power may be a DC power source in that case the schematic of FIG. 3 would be referenced.

Figure 8:
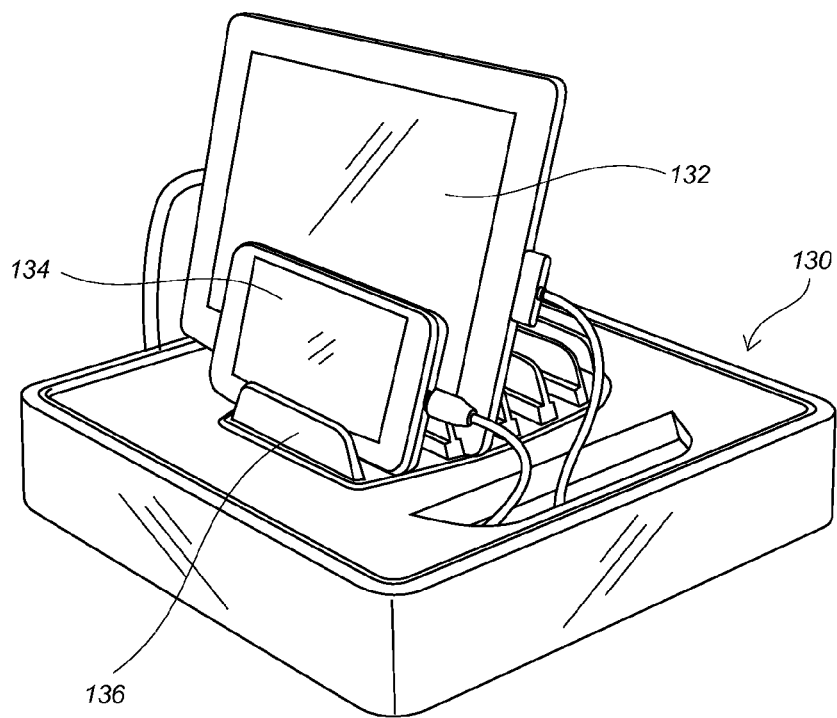
FIG. 8 is a top perspective view of a holder for a plurality of portable battery operated devices that is used to provide either a multiple voltage or a fixed voltage to a plurality of a battery powered devices.

Referring to FIG. 8, a holder 130 for a plurality of portable battery operated devices 132 is illustrated that is adapted to charge a selectable charge receiving device 134 powered by a DC battery (not shown). The holder 130 comprises a rack 136 including a plurality of vertical walls for retaining the plurality of battery operated devices.

Figure 9:
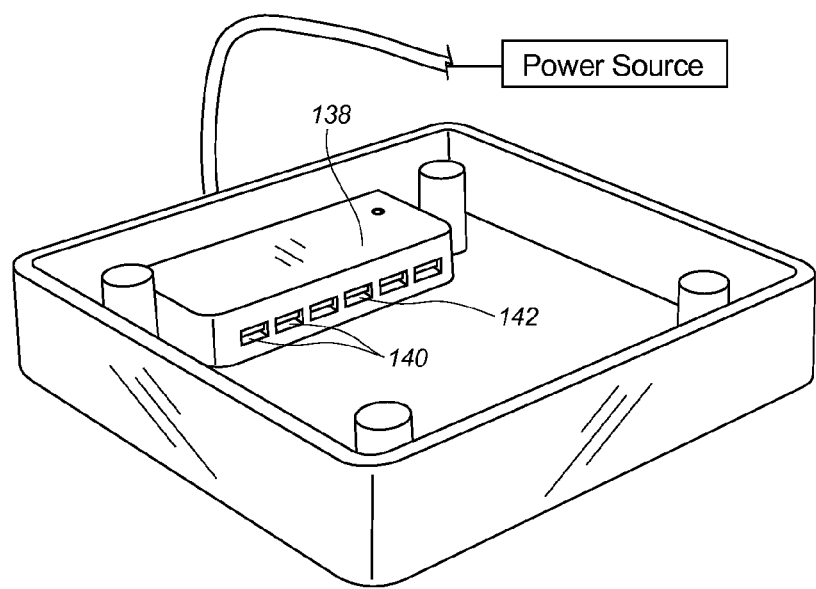
FIG. 9 is a bottom perspective view of the holder shown in FIG. 8.

Referring to FIG. 9, a housing 138 provided on the bottom of the rack 136. At least one multiple voltage output receptacle 140 is provided on the housing 138 and is adapted to provide a default level of voltage and a device selected predetermined level of voltage that is greater than the default level of voltage for charging the selectable charge receiving device 134.

Referring to FIGS. 2, 3 and 9, the housing 138 encloses a controller circuit 40 that communicates with the selectable charge receiving device 42 that is adapted to be charged at the predetermined level of voltage and that provides a charging level signal 46 to the voltage switching circuit 48. The variable output AC/DC converter circuit 50 is controlled by the voltage switching circuit 48 that is configured to provide the predetermined level of voltage on line 52 to the selectable charge receiving device 42. The housing 138 further encloses the fixed output converter circuit 56 that provides a fixed voltage level to at least one fixed charge receiving device 54 that may be connected to the fixed voltage receptacles 142. The housing 138 may also include at least one single voltage receptacle 142 and a fixed output converter circuit 56 or 76 that provides a fixed voltage level to at least one fixed charge receiving device connected to the single voltage receptacle 142.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A portable battery charger for a selectable charge receiving device comprising:
    a housing having a first plug adapted to be inserted into a DC receptacle;
    a second plug adapted to be inserted into an AC receptacle; and
    at least one multiple voltage receptacle provided on the housing for charging the selectable charge receiving device and adapted to provide a default level of voltage and a predetermined level of voltage that is greater than the default level of voltage;
    wherein the housing encloses:
        a control circuit that communicates with the selectable charge receiving device that is adapted to be charged at a predetermined level of voltage that the device may be charged at and that provides a charging level signal;
        a voltage switching circuit that receives the charging level signal; and
        a variable output converter circuit controlled by the voltage switching circuit that is configured to provide a DC charging voltage to the selectable charge receiving device.

2. The portable battery charger of claim 1, wherein the housing has a first end and a second end, the first plug being located at the first end and the second plug being located at the second end.

3. The portable battery charger of claim 2, wherein the first end includes a protruding portion adapted to be inserted into a DC receptacle.

4. A portable battery charger comprising:
    a housing having a first end and a second end;
    a first plug coupled to the first end of the housing, the first plug being configured to be inserted into a DC receptacle and receive DC current from a DC power source;
    a second plug coupled to the second end of the housing, the second plug being configured to be inserted into an AC receptacle and receive AC current from an AC power source;
    a control circuit retained within the housing, the control circuit being configured to provide a charging level signal in response to a signal from a selectable charge receiving device;
    a variable output converter circuit retained within the housing, the variable output converter circuit being configured to provide a DC charging voltage to the selectable charge receiving device;
    a voltage switching circuit retained within the housing, the voltage switching circuit being configured to control the DC charging voltage provided by the variable output converter circuit in response to receiving the charging level signal;
    a fixed output converter circuit retained within the housing, the fixed output converter circuit being configured to provide a fixed DC charging voltage;
    a multiple voltage receptacle arranged on the housing for charging the selectable charge receiving device, the multiple voltage receptacle being electrically coupled to the variable output converter circuit and adapted to provide a default level of voltage and a predetermined level of voltage that is greater than the default level of voltage; and
    a fixed voltage receptacle provided on the housing that is electrically coupled to the fixed output converter circuit and adapted to provide a fixed voltage level for a fixed charge receiving device that may only be charged at a fixed voltage level.

5. The portable battery charger of claim 4, wherein the variable output converter circuit includes a first DC-DC converter and the fixed output converter circuit includes a second DC-DC converter.

6. The portable battery charger of claim 4, wherein the variable output converter circuit includes a first AC-DC converter and the fixed output converter circuit includes a second AC-DC converter.

7. The portable battery charger of claim 4, wherein the first end includes a protruding portion adapted to be inserted into a DC receptacle.

8. The portable battery charger of claim 1, wherein the first plug includes a first male electrical connector and the second plug includes a second male electrical connector.

9. A portable battery charger for a selectable charge receiving device comprising:
    a housing having a first plug adapted to be inserted into a DC receptacle;

a second plug adapted to be inserted into an AC receptacle; and at least one multiple voltage receptacle provided on the housing for charging the selectable charge receiving device and adapted to provide a default level of voltage and a predetermined level of voltage that is greater than the default level of voltage, wherein the housing encloses:

a control circuit that communicates with the selectable charge receiving device that is adapted to be charged at a predetermined level of voltage that the device may be charged at and that provides a charging level signal;

a voltage switching circuit that receives the charging level signal; and a variable output converter circuit controlled by the voltage switching circuit that is configured to provide a DC charging voltage to the selectable charge receiving device; and a fixed output converter circuit retained within the housing, the fixed output converter circuit being configured to provide a fixed DC charging voltage, and a fixed voltage receptacle provided on the housing that is electrically coupled to the fixed output converter circuit and adapted to provide a fixed voltage level for a fixed charge receiving device that may only be charged at a fixed voltage level.

* * * * *